United States Patent [19]

Cheung

[11] Patent Number: 4,913,043
[45] Date of Patent: Apr. 3, 1990

[54] METHOD AND APPARATUS FOR FORMING EGG ROLLS

[76] Inventor: Yau T. Cheung, 2348 S. Canal St., Chicago, Ill. 60616

[21] Appl. No.: 164,277

[22] Filed: Mar. 4, 1988

[51] Int. Cl.$^4$ .............................................. A21C 9/06
[52] U.S. Cl. ................................ 99/450.6; 99/450.7; 425/110; 425/135; 425/146; 425/363; 425/403.1
[58] Field of Search ................ 99/450.6, 450.7, 450.1; 425/110, 135, 145, 150, 363, 403.1, 383, 407

[56] References Cited

U.S. PATENT DOCUMENTS

| | | |
|---|---|---|
| 3,633,517 | 1/1972 | Kao . |
| 3,912,433 | 10/1975 | Ma ................................ 99/450.6 X |
| 3,930,440 | 1/1976 | Ohkawa ............................ 99/450.6 |
| 3,946,656 | 3/1976 | Hai ................................. 99/450.6 |
| 4,047,478 | 9/1977 | Trotsmann et al. ............... 99/450.6 |
| 4,084,493 | 4/1978 | Quintana ............................ 99/450.7 |
| 4,313,719 | 2/1982 | Lundgren ....................... 99/450.6 X |
| 4,388,059 | 6/1983 | Ma ................................ 99/450.6 X |
| 4,439,124 | 3/1984 | Watanabe ...................... 99/450.6 X |
| 4,516,487 | 5/1985 | Madison et al. ................... 99/450.6 |
| 4,517,785 | 5/1985 | Masuda ......................... 99/450.6 X |
| 4,591,328 | 5/1986 | Cheung . |
| 4,608,919 | 9/1986 | Prows et al. ................... 99/450.7 X |

*Primary Examiner*—Frankie L. Stinson
*Attorney, Agent, or Firm*—Kinzer, Plyer, Dorn, MacEachran & Jambor

[57] ABSTRACT

An apparatus for forming an egg roll. A sheet of dough is placed on a conveyor belt, with a corner of the dough pointed in the direction of movement of the belt. An egg roll filling is placed on the dough with the filling extending transversely to the direction of movement of the conveyor belt. The leading corner of the dough is reversely folded over and around the upper surface of the filling by a deflector. The dough is creased along its length of movement on both sides immediately outwardly of the ends of the egg roll by O-ring belts guided about pulleys. The opposite corners of the dough, which extend transversely to the direction of movement of the conveyor belt, are folded about the creases inwardly over the filling and the opposite corners of the dough are pressed downwardly toward each other by belts which gradually bend from a horizontal support surface to an inwardly inclined belt surface. The corners of the dough are pressed to their final positions by disks. The folded dough is creased rearwardly of the filling in a transverse direction by a paddle wheel which also tightens the previously made folds of the dough and the egg roll and its filling are rolled in the direction opposite to their direction of movement on the conveyor belt by an overhead conveyor belt to form the side and trailing corners of the dough into the cylindrical egg roll shape.

7 Claims, 4 Drawing Sheets

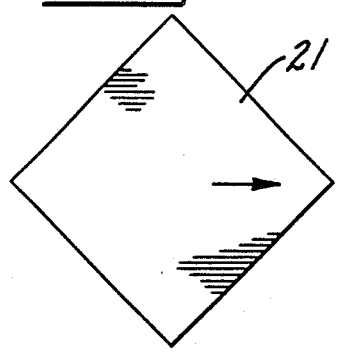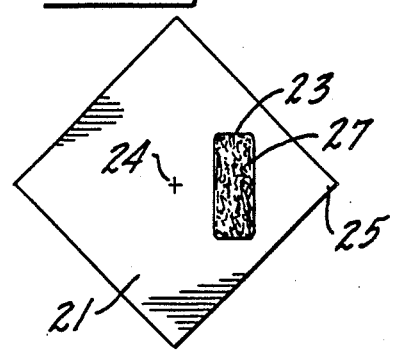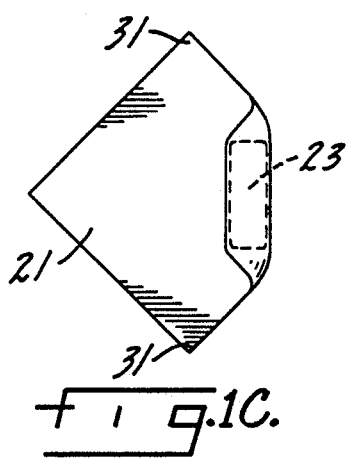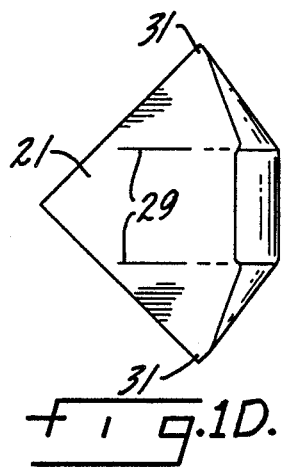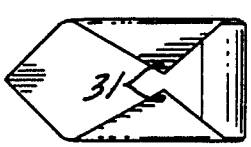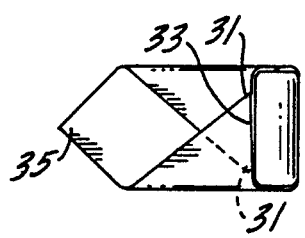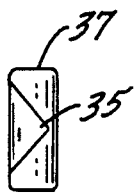

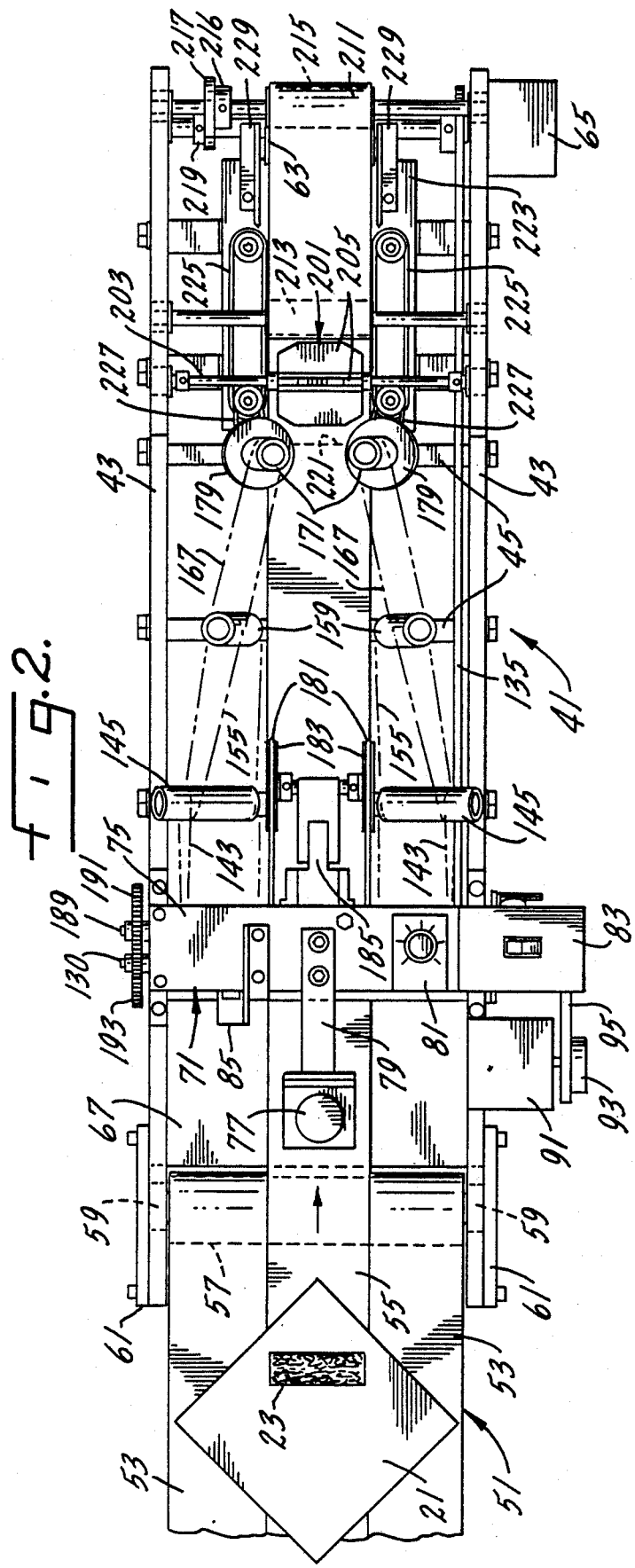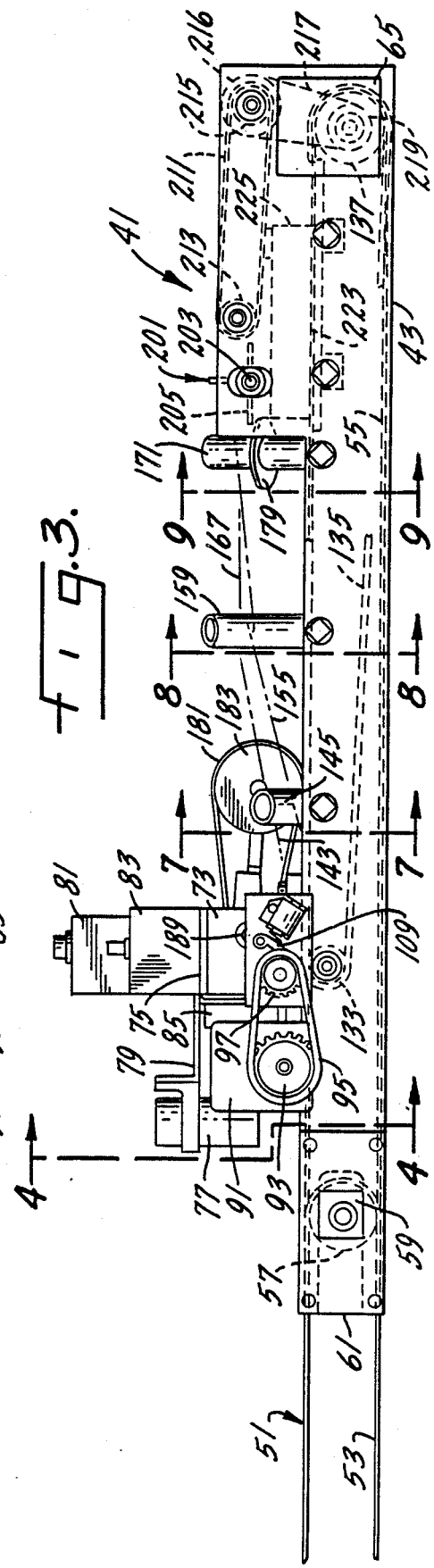

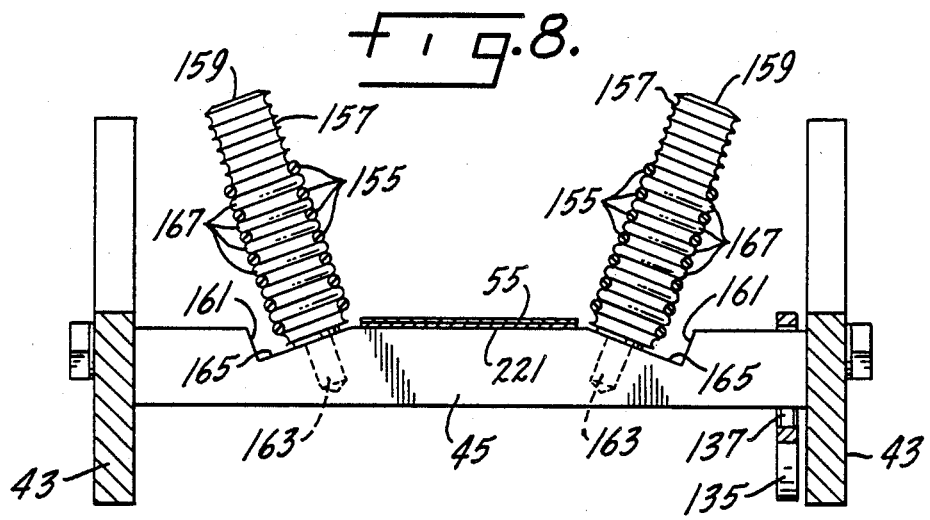
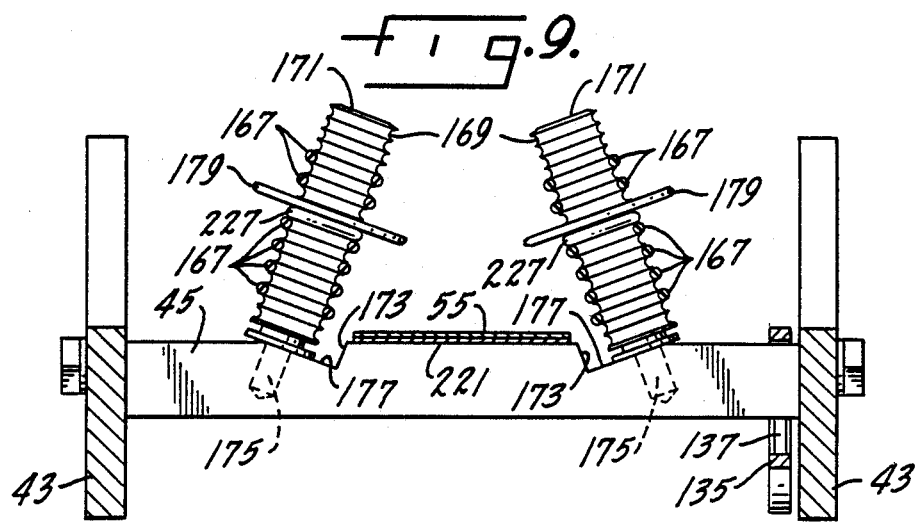
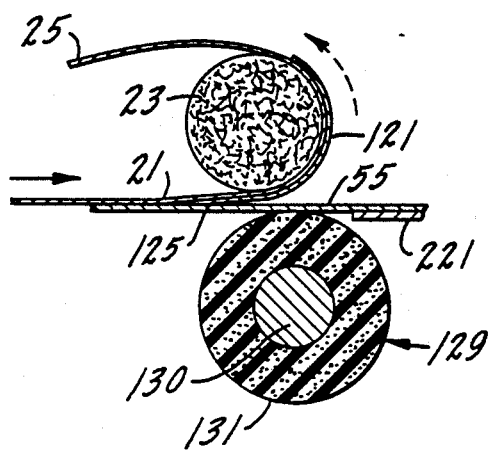
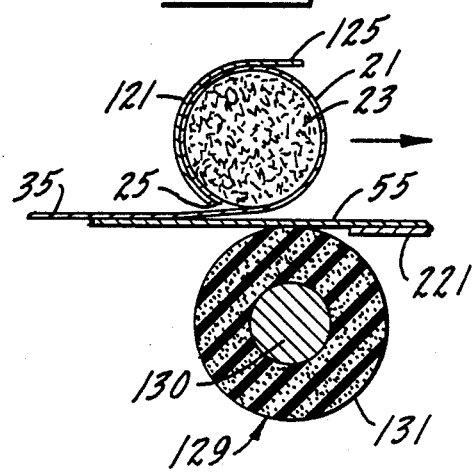

METHOD AND APPARATUS FOR FORMING EGG ROLLS

BACKGROUND AND SUMMARY OF THE INVENTION

Traditionally, foods such as egg rolls and similar food items which include a filling or stuffing wrapped in a sheet of dough have been made by hand. Prior attempts to make such items by machines have produced food items that do not have the traditional shape and appearance which the consumer has come to expect in such a food item. Since appearance is so important in the consumers' acceptance of food items, machine-made foods such as egg rolls that do not have the traditional shape of a handmade egg roll have not been successful. Other attempts to form traditionally shaped egg rolls have resulted in complicated and hard to maintain machines which have not been economical to build or operate.

Therefore, this invention is concerned with a method for the continuous manufacture of traditionally shaped egg rolls and a simplified apparatus for efficiently performing the method of the invention.

An object of this invention is a method and apparatus which will rapidly produce a tightly folded egg roll of traditional shape.

Another object of the invention is an apparatus for producing egg rolls in which the speed of the apparatus can easily be adjusted to allow for variances in the consistency, size and shape of the ingredients being formed into the egg roll.

Other objects will become apparent from the following specification, claims and drawings.

BRIEF DESCRIPTION OF THE DRAWINGS

The invention is illustrated more or less schematically and diagrammatically in the following drawings wherein:

FIGS. 1A–1G show the steps of the method of my invention in preparing an egg roll of traditional shape;

FIG. 2 is a top plan view of the apparatus for performing the method of my invention, with a feeding conveyor broken away for clarity of illustration;

FIG. 3 is a side elevational view of the apparatus of FIG. 2;

FIG. 8 is a cross-sectional view taken along line 8—8 of FIG. 3;

FIG. 9 is view taken along line 9—9 of FIG. 3;

FIG. 10 is an enlarged partial view of the dough deflector in its dough deflecting position; and FIG. 11 is an enlarged view similar to FIG. 10 showing the deflector in its egg roll releasing position.

DESCRIPTION OF THE PREFERRED EMBODIMENT

Figure 4:
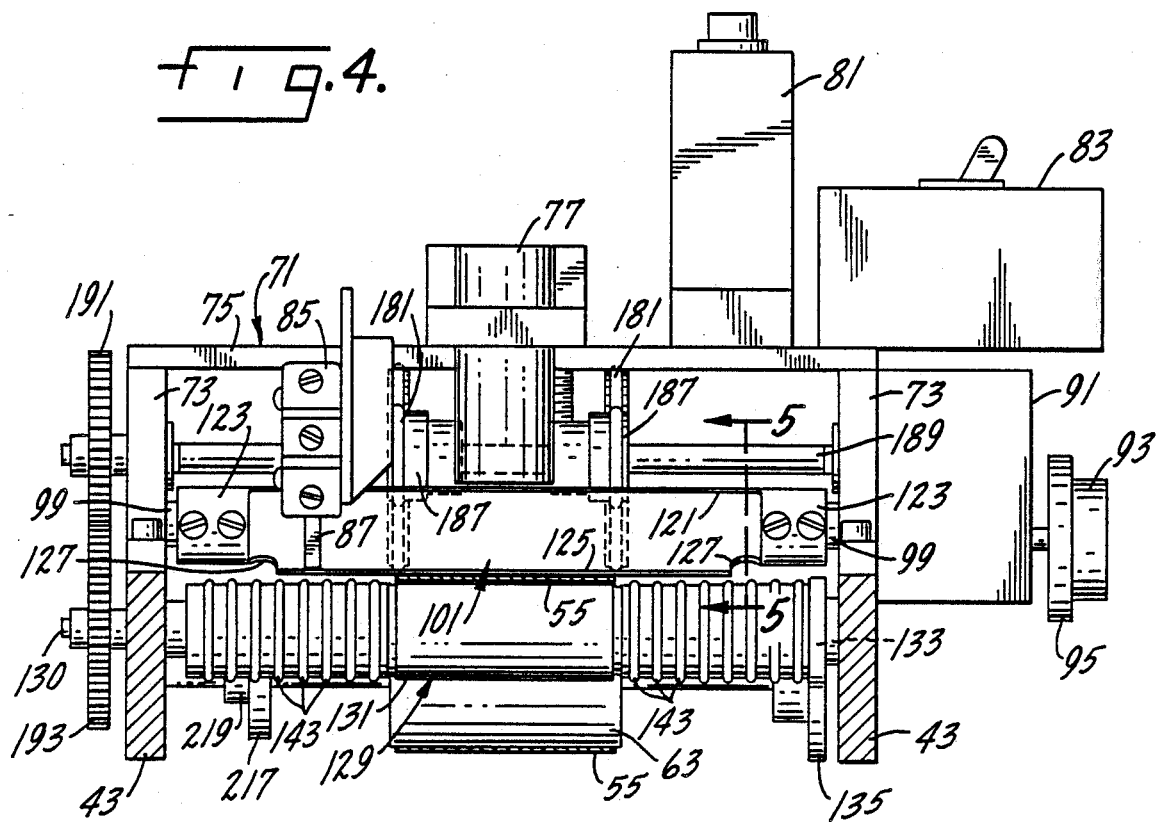
FIG. 4 is an enlarged view taken along line 4—4 of FIG. 3, with some parts shown in cross section.

The method of my invention is shown schematically in FIGS. 1A–1G of the drawings, with the machinery which performs the steps of my method omitted in the drawings of FIGS. 1A–G for clarity of illustration and explanation. The machinery which performs these steps is shown in FIGS. 2–11 of the drawings and will be explained in detail later in this specification.

In the first step of my method shown in FIG. 1A of the drawings, a square sheet 21 of dough is placed on a moving surface which may be a conveyor belt, with a corner of the sheet of dough pointed in the direction of movement of the surface. As is conventional, the trailing edge of the sheet 21 of dough may be sprayed or brushed with a whole egg and water mix for increased adhesion and is approximately six inches in length on each side.

In the second step of my method shown in FIG. 1B, a substantially cylindrical egg roll filling 23 is placed on the square sheet of dough 21, with the cylindrical filling extending generally transversely of the direction of movement of the supporting surface and positioned ahead of the center 24 of the sheet of dough.

In the third step of my method shown in FIG. 1C of the drawings, the leading corner 25 of the square sheet 21 of dough is reversely folded over and around the upper surface 27 of the cylindrical egg roll filling.

In the fourth step of my method shown in FIG. 1D of the drawings, the sheet 21 of dough is creased along its length of movement on opposite sides thereof, immediately outwardly of the ends of the cylindrical egg roll filling 23 to form crease lines 29 in the dough.

In the next step of my method shown in FIG. 1E of the drawings, the opposite corners 31 of the square sheet 21 of dough which extend transversely to the direction of movement of the sheet of dough are folded about the crease lines 29 inwardly over the cylindrical egg roll filling 23, with the opposite corners 31 of the dough pressed downwardly toward each other.

In the next step of my method shown in FIG. 1F of the drawings, the sheet of dough is transversely creased along line 33 located immediately rearwardly of the cylindrical egg roll filling 23 and the previously made folds are tightened.

In the last step of my method shown in FIG. 1G of the drawings, the cylindrical egg roll filling 23 and its surrounding sheet of dough 21 are rolled in the direction opposite to the direction of movement of the filling and dough on the moving surface to tightly form the side corners 31 and trailing corner 35 of the sheet of dough into the traditional egg roll shape 37.

An apparatus for automatically and continuously forming the egg roll 37 according to the method of my invention is shown in FIGS. 2–11 of the drawings. Referring particularly now to FIGS. 1 and 2 of the drawings, the apparatus 41 is designed to be supported on a table or framework, which may be conventional and, therefore, is not shown for simplicity of illustration and explanation. The apparatus 41 includes side beams 43 which are connected by cross members 45, all of which are formed of a suitable metal, such as stainless steel of the type which is suitable for use in the food processing industry. In the embodiment of the invention shown, the side beams 43 and cross members 45 are bolted together, but, of course, it should be understood and appreciated that other means of attachment, such as welding or the like, may also be used.

A feed conveyor 51 connects to the upstream side of the apparatus 41 which, for purposes of explanation, is the left hand side of the apparatus 41 shown in FIGS. 2 and 3 of the drawings. The feed conveyor consists of three narrow belts of generally equal width, with two of the belts 53 located on each side of a center conveyor belt 55. The outer belts 53 terminate at the upstream end of the apparatus 41, while the center belt 55 extends the combined length of the feed conveyor and the apparatus 41. The belts 53 are driven at the upstream end of the feed conveyor 51, by a conventional drive mechanism which is not shown in these drawings. The conveyor belts 53 and 55 may be constructed of a synthetic, canvas-like material of a type suitable for use in the food processing industry.

The belts 53 are supported at their downstream end on an idler roller 57 which is journaled in blocks 59, which are slidably supported in plates 61 mounted on the side beams 43 of the apparatus 41 for adjusting tension on the belts 53. The center belt 55 rides on the top of the idler roller 57 and is driven by a roller 63 at the downstream end of the apparatus 41. The roller 63 is rotated by a drive motor 65 through a suitable gearing arrangement, which is not shown in the drawings for clarity of illustration. The belts 53 and 55 are driven at the same speed to carry the sheet of dough 21 and its egg roll filling 23 onto the apparatus 41. The sheet of dough 21 and the egg roll filling 23 may be placed on the belts 53 and 55 by a worker or by a suitable mechanism which does not constitute a part of this invention.

A transfer plate 67 mounted between side beams 43 allows the sheet of dough and the egg roll filling to continue moving between the end of belts 53 and the apparatus 41.

A bridging structure 71 is mounted on the side beams 43 at the upstream end of the apparatus 41, shown in the left hand side of FIGS. 2 and 3 of the drawings. The bridging structure extends across the width of the apparatus 41. The bridging structure includes uprights 73 supported on the apparatus side beams 43 and a top plate 75 supported on the uprights 73.

An electric eye 77 is cantileverly mounted at the end of a arm 79 attached to the top plate 75, with the electric eye located upstream of the bridging structure 71 and aimed downwardly toward the conveyor belt 55. Also mounted on the top plate 75 are a solid state, adjustable timing switch 81, an on/off switch 83 for the power supply for the electric eye and other electrical equipment supported on the bridging structure 71 and a limit switch 85. The limit switch 85 is shown most clearly in FIG. 4 of the drawings and is mounted o the upstream side of the bridging structure 71 with a contact finger 87 that extends downwardly toward the conveyor belt 55.

Mounted on the side beams 43, immediately upstream of the bridging structure 71, is an electric motor 91 whose power supply is also controlled by the on/off switch 83. An output sprocket gear 93 of the motor drives a chain 95, which in turn drives a sprocket gear 97. As can be best seen in FIGS. 4 and 5 of the drawings, the sprocket gear 97 is fixed to one of two stub shafts 99 which are located at opposite ends of an elongated dough deflector 101. The stub shafts 99 are journaled in the uprights 73 of the bridging structure 71.

Figures 5, 6:
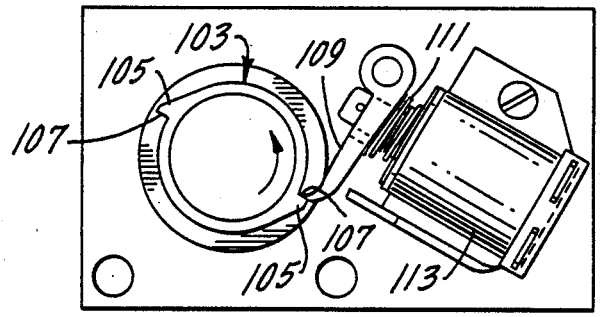
FIG. 5 is a cross-sectional view taken along line 5—5 of FIG. 4.
FIG. 6 is an enlarged end view of the cam and pawl mechanism for the dough deflector of FIG. 4.
Figure 7:
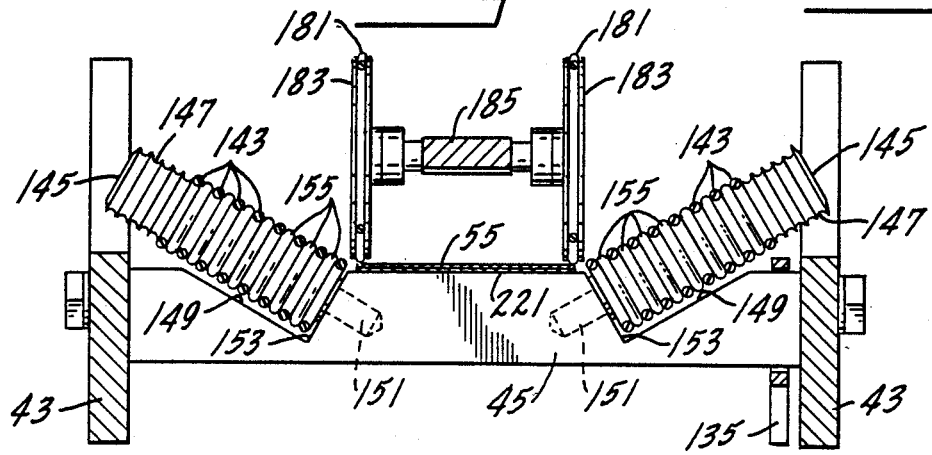
FIG. 7 is a cross-sectional view taken along line 7—7 of FIG. 3.

Mounted on the stub shaft 99 which is located adjacent the sprocket gear 97 is a cam 103, as shown in FIG. 6 of the drawings. The cam has two, diametrically located lobes 105, with each lobe having a detent 107. A spring clutch (not shown) is operatively connected between the sprocket gear 97 and the cam 103. A pivotally mounted pawl 109, shown in FIGS. 3 and 6 of the drawings, is biased by spring 111 into contact with the cam 103 to hold the cam and the dough deflector 101 in one or the other of the two positions of the dough deflector, shown in FIGS. 10 and 11 of the drawings. A suck-in solenoid 113 is connected to the pawl 109. The solenoid 113 is momentarily energized when the upper surface 27 of the cylindrical filling 23 is detected by the electric eye 77. The solenoid, when energized moves the pawl 109 momentarily out of contact with the cam 103 to permit rotation of the stub shaft 99 and the dough deflector 101 by the continuously driven sprocket gear 97 approximately 180 degrees to a position wherein the pawl engages the other detent 107. The dough deflector 101 is now in its deflecting position shown in FIGS. 4 and 10 of the drawings.

The dough deflector 101 is shown in detail in FIGS. 4, 5, 10 and 11 of the drawings. It is in the shape of a semi-cylindrical, thin-walled tube 121 having cylindrical end tubes 123 which are rolled around and fastened to the stub shafts 99. One longitudinal edge 125 of the tube 121, as is shown most clearly in FIG. 5 of the drawings, is bent tangentially to the semi-cylindrical tube 121 so that it engages the conveyor belt 55 when the deflector is in its intersecting position, shown in FIG. 10 of the drawings. The tube 121 is notched at 127 at its opposite ends to enable the longitudinal edge 125 to be bent tangentially. The deflector 101 performs the step shown in FIG. 1C and 10 of the drawings which involves engaging the leading corner 25 of the sheet 21 of dough to reversely fold the leading corner over the cylindrical egg roll filling 23.

As shown in FIGS. 4 and 10 of the drawings, the tangential edge 125 of the semi-cylindrical tube 121 contacts the conveyor belt 55 immediately upstream of a driven, soft-surfaced roller 129 having a conveyor belt support section 131 in the center thereof. When the deflector 101 is rotated to the position shown in FIGS. 4 and 10 of the drawings, the finger 87 of the limit switch 85 is moved. This performs the dual functions of supplying power to the timing switch 81 and also actuating it to prevent power from energizing the solenoid 113 for a selected short time period to thereby hold the deflector in the position of FIG. 10 until the leading edge of the sheet of dough is reversely folded over the egg roll filling. At the end of this short time period, the solenoid 113 is momentarily energized to allow rotation of the dough deflector approximately 180 degrees to the position shown in FIG. 11 of the drawings which wraps the leading edge of the sheet of dough around the cylindrical egg roll filling. The time delay provided by the switch 81 is adjustable to allow for variations in the speed of the conveyor belt 55 and to vary the amount of folding of the leading edge of the sheet of dough over the egg roll filling.

A driven shaft 130 within the roller 129 has a gear 133 affixed to one end thereof, which is driven by a chain 135 rotated by a sprocket 137 on the shaft of the driven roller 63 at the downstream end of the apparatus 41. The roller 129 is formed of rubber and has grooves formed on both sides of its belt support section 131. Synthetic rubber belts 143 of O-ring cross section are seated in the grooves of the roller 129. The belts extend from the grooves of the roller 129, where they form a horizontal support surface for the sheet 21 of dough, to loop around inclined idler rollers 145, shown in FIG. 7 of the drawings, riding in grooves 147 formed in the inclined rollers to change to inclined support surfaces on each side of the conveyor belt 55 for the corners 31 of the sheet 21 of dough. The rubber belts 143 are seated in alternate grooves 147 of the inclined rollers 145.

The inclined rollers 145 are positioned in notches 149 cut into a cross member 45 of the apparatus 41 and are rotationally mounted in holes 151 formed in inclined side walls 153 of the notches. The inclined rollers lean outwardly at an included angle of approximately 30 degrees relative to the horizontal. The rubber belts 143 extend between the horizontal driven roller 129 and the inclined idler rollers 145, forming gradually inclining supporting surfaces for the opposite corners 31 of the sheet 21 of dough to commence folding of the corners of the sheet of dough inwardly and over the filling 23 toward the position indicated in the step shown in FIG. 1E of the drawings Another set of synthetic rubber belts 155 of O-ring cross section are seated in the alternate grooves 147 of the inclined rollers 145. The opposite ends of these O-ring belts are seated in grooves 157 formed in inclined idler rollers 159, which are located downstream of the rollers 145 and are shown in FIG. 8 of the drawings. The inclined rollers 159 are positioned in notches 161 cut in a cross member 45 and are rotationally mounted in holes 163 formed in inclined walls 165 of the notches. The inclined rollers 159 each lean outwardly at an included angle of approximately 70 degrees relative to the horizontal.

A third set of rubber belts 167, similar in construction to the previous belts, are seated in the grooves 157 of the rollers 159 and extend to grooves 169 of a third set of inclined rollers 171 located farther downstream on the apparatus 41. The inclined rollers 171 are positioned in notches 173 cut in a cross member 45, shown in FIG. 9 of the drawings. These inclined rollers are rotationally mounted in holes 175 formed in inclined walls 177 of the notches. The inclined rollers 171 lean inwardly, each at an included angle of approximately 70 degrees relative to the horizontal.

The sets of rubber belts 143, 155 and 167 located on opposite sides of the conveyor belt 55 create a folding mechanism that supports the corners 31 of the sheet 21 of dough and completes the folding of the corners inwardly and over the egg roll filling 23 to the configuration shown in FIG. 1E of the drawings. The final folding and hold down of the corners of the sheet of dough is accomplished by disks 179 which are mounted on the inclined rollers 171. The sets of rubber belts 143, 155 and 167 are driven by the roller 129 to move at the same linear speed as the conveyor belt 55.

The crease lines 29 which are formed on the sheet 21 of dough, as shown in FIG. 1D of the drawings, are formed by O-ring belts 181 which ride around pulleys 183 journaled on the end of an arm 185, which is pivotally mounted for up and down movement on the downstream side of the bridging structure 71. The belts 181 are driven by pulleys 187 affixed to a rotating shaft 189, as shown in FIG. 4 of the drawings. The shaft 189 is journaled in the uprights 73 (see FIGS. 3 and 4) of the bridging structure and on one side of the apparatus (the left side of FIG. 4) the shaft extends through and outwardly of the upright 73. A gear 191 affixed to the shaft 189 meshes with and is driven by a gear 193 affixed to shaft 130, which is driven by chain 135. The up and down movement of the arm 185 allows the belts 181 to accommodate the partially folded sheet 21 of dough and its egg roll filling 23 as these items are discharged from the dough deflector 101 to crease the folded dough along crease lines 29, as shown in FIG. 1D. This occurs as the folding of the corners of the dough is commenced by engagement with the belts 143.

As shown in FIGS. 2 and 3 of the drawings, a paddle wheel 201 is mounted on a shaft 203 which is journaled in the side beams 43 of the apparatus 41. The paddle wheel has four blades 205 and is rotated by engagement with the partially folded sheet of dough 21 and filling 23, as shown in FIG. 1F of the drawings, so that one of its blades 205 impresses a transverse crease 33 on the sheet of dough immediately rearwardly of the filling 23. The contact of one of the blades 205 with the sheet of dough completes the folding of corners 31 and tightens the engagement of the folded leading corner 25 of the dough with the filling 23. Although the paddle is constructed as a free wheeling paddle in this embodiment, it should be understood and appreciated that it may be arranged to be driven in timed sequence with the movement of the partially folded egg rolls on the conveyor belt 55, if desired.

In order to complete the folding and rolling of the sheet of dough 21 to obtain the finished egg roll shape 37, shown in FIG. 1G of the drawings, an overhead conveyor belt 211 is provided immediately downstream of the paddle wheel 201. The conveyor belt 211 is made of a rubberized material with a roughened gripping surface to engage the dough-covered egg rolls. The direction of movement of its lower run is opposite to the direction of movement of the upper run of the conveyor belt 55, and the linear speed of the conveyor belt 211 is set at approximately one-half of the speed of the belt 55. The belt 211 is supported on a forward roller 213 and a rearward roller 215. The roller 215 has a gear 216 driven by a chain 217 which meshes with a gear 219 on the shaft of roller 63 of the main drive mechanism. The gear 216 has a larger diameter than the gear 219 so that the conveyor belt 211 runs at a slower speed than the conveyor belt 55. The belt 211 declines from its upstream end to its downstream end and is positioned above the belt 55 a sufficient distance so that it engages the completely folded and partially rolled dough and filling to complete the rolling to the traditional egg roll shape 37, shown in FIG. 1G of the drawings.

The belt 55 is supported by a plate 221 which extends from just downstream of the roller 129, as shown in FIGS. 10 and 11 of the drawings, to the inclined rollers 171, shown in FIG. 9 of the drawings. Downstream of the paddle wheel 201, and under the reverse rolling conveyor 211, the belt is supported by a plate 223. On opposite sides of the belt 55, extending from the paddle wheel and downstream thereof, are retainer conveyor belts 225 which are driven by an O-ring belt 227, which rides in the grooves 169 of the inclined roller 171. The function of these retainer conveyor belts is to prevent the partially rolled dough and filling from falling off the belt 55. The retainer conveyor belts 225 move at the same linear speed as the conveyor belt 55. Near the end of the belt 55 are guides 229 mounted on the plate 223 which hold the finished egg roll 37 on the conveyor 55.

While one particular embodiment of apparatus for practicing the method of my invention has been shown and described, it will be obvious to those skilled in the art that changes and modifications may be made without departing from the invention, and, therefore, the purpose of the appended claims is to cover all such changes and modifications which fall within the scope of my invention.

Also, while the invention has been described for use in forming egg rolls, it should be appreciated that other items can also be formed using both the method and apparatus of my invention. Therefore, it should be appreciated that the present method and apparatus of my invention can be used to form other items into their desired shape and is not limited to egg rolls.

What is claimed:

1. An apparatus for forming a food item such as a traditionally shaped egg roll, including:
   a conveyor belt means for receiving and supporting a square sheet of dough and a cylindrical egg roll filling and moving them on the conveyor belt means with one corner of the sheet of dough pointed in the direction of movement of the conveyor belt means,
   means to engage the leading corner of the sheet of dough and to reversely fold it around the cylindrical egg roll filling,
   means to crease the dough along its length of movement immediately outwardly of the ends of the cylindrical egg roll filling,
   means to fold the opposite corners of the square sheet of dough which extend transversely to the direction of movement of the conveyor belt means about the creases, inwardly over the cylindrical egg roll filling and disc means to press said opposite corners of the sheet of dough downwardly toward each other,
   means to transversely crease the folded dough rearwardly of the cylindrical egg roll filling, and
   means to roll the cylindrical egg roll filling in the direction opposite to the direction of movement of the conveyor belt means to fold the side and trailing corners of the sheet of dough into the traditional cylindrical egg roll shape,
   said means to transversely crease the folded dough rearwardly of the cylindrical egg roll filling including a freely rotatable paddle having blades, with the paddle being rotated by engagement with the partially folded dough and cylindrical egg roll filling and one of the blades of the paddle contacting the dough rearwardly of the cylindrical egg roll filling to crease the folded dough.

2. The apparatus of claim 1 in which the means to roll the cylindrical egg roll filling in the direction opposite to the direction of movement of the dough sheet conveyor belt means is a second conveyor belt means for engaging the partially dough-enclosed cylindrical egg roll filling mounted above the dough sheet conveyor belt means, with the second conveyor belt means moving in the opposite direction of movement of the sheet of dough and at a slower speed than that of the dough sheet conveyor belt means.

3. An apparatus for folding an edge of a sheet of dough over a cylindrical filling to substantially encircle the cylindrical filling with the dough, including:
   a conveyor for moving a sheet of dough carrying a cylindrical filling along a defined path,
   a concave-faced deflector extending across said defined path and engaging said conveyor to receive the leading edge of the sheet of dough, to reversely fold said leading edge over the cylindrical filling and to capture said cylindrical filling in said concave face,
   said deflector being formed with a semi-circular cavity having a tangential lip on one edge, which lip engages the conveyor when the deflector presents a concave face to the approaching sheet of dough and filling,
   means to rotate said deflector about said cylindrical filling and said reversely folded leading edge of said sheet of dough to press said dough against said cylindrical filling to encircle said filling and to permit the dough encircled cylindrical filling to be carried out of the concave face of the deflector by the continuous movement of the conveyor,
   said means to rotate said deflector including:
   a constantly driven gear,
   a spring clutch between said driven gear and said deflector,
   a cam carried by said deflector with at least one detent formed on said cam,
   a pawl riding on said cam and engageable with said detent to stop rotation of said deflector,
   solenoid means to move said pawl out of engagement with said detent to allow rotation of said deflector,
   a power source to energize said solenoid means,
   a sensor to detect the approach of the cylindrical filling on the sheet of dough relative to the deflector and to connect said power source to said solenoid means to move said pawl out of engagement with said detent to allow said deflector to be rotated to a position in which its tangential lip engages the conveyor and it presents a concave face to the approaching sheet of dough and filling,
   an adjustable timer to delay connection of said solenoid means to said power source for a selectable time period after said timer is actuated, and
   switch means to detect the position of rotation of said deflector lip and to energize said timing circuit when said lip comes into engagement with the conveyor.

4. An apparatus for folding the corners of a square sheet of dough over a cylindrical filling positioned on the sheet of dough, including:
   a narrow conveyor belt supporting the square sheet of dough and cylindrical filling with opposite corners of the sheet of dough extending laterally beyond the conveyor belt,
   a supporting and bending means for the laterally extending corners of the sheet of dough positioned on each side of the narrow conveyor belt,
   said supporting and bending means including:
   a series of sets of individual, narrow, elastic belts of O-ring cross section spaced laterally of one another and supported for rotation on rollers positioned along the length of the narrow conveyor belt,
   a generally horizontal drive roller located at the upstream of the series of sets of individual, narrow, elastic belts and driving engaging sets of the O-ring belts on both sides of the narrow conveyor,
   a first set of idler rollers, one on each side of the narrow conveyor belt, located downstream of the horizontal drive roller and inclined outwardly and upwardly with the sets of O-ring belts driven by the horizontal drive roller looped around said first set of idler rollers to start folding of the corners of the sheet of dough over the cylindrical filling on the narrow conveyor belt,
   a second set of idler rollers, one on each side of the narrow conveyor belt, located downstream of the first set of idler rollers and inclined upwardly and inwardly more than the first set of rollers, second sets of O-ring belts looped around said first and second sets of idler rollers to drive said second sets of rollers to continue the folding of the corners of the sheet of dough over the cylindrical filling on the narrow conveyor belt, and
   a third set of idler rollers, one on each side of the narrow conveyor belt, located downstream of the second set of idler rollers and inclined upwardly and inwardly, third sets of O-ring belts looped around said second and third sets of rollers to drive said third set of rollers to complete the folding of the corners of the sheet of dough over the cylindrical filling on the narrow conveyor belt.

5. The apparatus of claim 4 in which a disk is mounted on each of the third set of idler rollers to press the folded corners of the sheet of dough against the cylindrical filling on the narrow conveyor belt.

6. The apparatus of claim 4 further including a freely rotatable paddle having blades located downstream of the third set of idler rollers, with the paddle being rotated by engagement with the partially folded dough and cylindrical egg roll filling and one of the blades of the paddle contacting the dough rearwardly of the cylindrical egg roll filling to crease the folded dough.

7. The apparatus of claim 6 further including a second narrow conveyor belt for engaging the partially dough-enclosed cylindrical egg roll filling mounted above the narrow conveyor belt, with the second narrow conveyor belt moving in the opposite direction of movement of the sheet of dough and at a slower speed than that of the narrow conveyor belt.

* * * * *